(12) United States Patent
Antonopoulos et al.

(10) Patent No.: US 8,795,046 B2
(45) Date of Patent: Aug. 5, 2014

(54) METHOD FOR DISPLAYING A DRAW RESULT ALONG WITH CUSTOMIZED INFORMATION

(75) Inventors: Constantinos Antonopoulos, Kifisia (GR); Andreas Boronikolos, Ekali (GR); Yannis Minadakis, Seattle, WA (US)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 994 days.

(21) Appl. No.: 12/036,390

(22) Filed: Feb. 25, 2008

(65) Prior Publication Data

US 2008/0207320 A1 Aug. 28, 2008

Related U.S. Application Data

(60) Provisional application No. 60/891,591, filed on Feb. 26, 2007, provisional application No. 60/956,917, filed on Aug. 20, 2007.

(51) Int. Cl.
| | |
|---|---|
| *A63F 13/803* | (2014.01) |
| *A63F 13/52* | (2014.01) |
| *G07F 17/32* | (2006.01) |
| *A63F 13/10* | (2006.01) |

(52) U.S. Cl.
CPC ......... *G07F 17/32* (2013.01); *A63F 2300/5546* (2013.01); *G07F 17/3223* (2013.01); *A63F 2300/5513* (2013.01); *A63F 2300/5506* (2013.01); *A63F 2300/632* (2013.01); *A63F 2300/6623* (2013.01); *A63F 13/10* (2013.01); *G07F 17/3227* (2013.01); *A63F 2300/6669* (2013.01); *G07F 17/3286* (2013.01)
USPC .................................. 463/6; 463/16; 463/31

(58) Field of Classification Search
USPC .......................... 463/6, 18–22, 31–32, 59–60
See application file for complete search history.

(56) References Cited

U.S. PATENT DOCUMENTS

| | | | |
|---|---|---|---|
| 4,797,836 A | 1/1989 | Witek et al. | |
| 5,324,035 A | 6/1994 | Morris et al. | |

(Continued)

FOREIGN PATENT DOCUMENTS

| | | |
|---|---|---|
| WO | 2005/086969 A2 | 9/2005 |
| WO | 2006014722 A1 | 2/2006 |

OTHER PUBLICATIONS

Softimage 1xs3 6: New Features and Enhancements, Found at http://www.videoguys.com/softimage.html (4 pages).

(Continued)

*Primary Examiner* — Bach Hoang
(74) *Attorney, Agent, or Firm* — Greenberg Traurig, LLP (57) ABSTRACT

In another embodiment of the present invention a computer-implemented method for displaying a draw result is provided, comprising: generating a draw result, wherein the draw result indicates at least a first place winner; rendering with a computer a first video presentation for display at a first terminal, wherein the first video presentation comprises first content and an indication of the draw result; rendering with a computer a second video presentation for display at a second terminal, wherein the second video presentation comprises second content and an indication of the draw result, and wherein the first content is distinct from the second content; transmitting the first video presentation to the first terminal; and transmitting the second video presentation to the second terminal.

30 Claims, 6 Drawing Sheets

(56) References Cited

U.S. PATENT DOCUMENTS

| | | | |
|---|---|---|---|
| 5,326,104 A | 7/1994 | Pease et al. | |
| 5,717,848 A | 2/1998 | Watanabe et al. | |
| 5,851,149 A | 12/1998 | Xidos et al. | |
| 6,652,378 B2 * | 11/2003 | Cannon et al. | 463/20 |
| 6,714,201 B1 | 3/2004 | Grinstein et al. | |
| 6,793,575 B2 * | 9/2004 | Brown et al. | 463/6 |
| 6,887,150 B2 * | 5/2005 | Hayashi | 463/6 |
| 6,921,331 B2 * | 7/2005 | Gatto et al. | 463/6 |
| 7,151,542 B2 | 12/2006 | Isner | |
| 7,167,180 B1 | 1/2007 | Shibolet | |
| 2002/0169013 A1 * | 11/2002 | Serizawa et al. | 463/6 |
| 2003/0008695 A1 | 1/2003 | Libby et al. | |
| 2003/0060247 A1 * | 3/2003 | Goldberg et al. | 463/1 |
| 2003/0114211 A1 | 6/2003 | White | |
| 2004/0009796 A1 * | 1/2004 | Ludlow | 463/6 |
| 2004/0053686 A1 * | 3/2004 | Pacey et al. | 463/25 |
| 2006/0111168 A1 | 5/2006 | Nguyen et al. | |
| 2006/0166731 A1 * | 7/2006 | Yoshimi et al. | 463/20 |
| 2006/0189368 A1 | 8/2006 | Goss | |
| 2006/0192783 A1 | 8/2006 | Kass et al. | |
| 2006/0211471 A1 | 9/2006 | Walker et al. | |
| 2006/0234791 A1 | 10/2006 | Nguyen et al. | |
| 2006/0246988 A1 | 11/2006 | Walker et al. | |
| 2006/0247039 A1 * | 11/2006 | Lerner et al. | 463/29 |
| 2006/0258432 A1 | 11/2006 | Packer et al. | |
| 2007/0085851 A1 | 4/2007 | Muller et al. | |
| 2008/0102947 A1 * | 5/2008 | Hays et al. | 463/31 |
| 2008/0207300 A1 | 8/2008 | Antonopoulos et al. | |

OTHER PUBLICATIONS

Final Office Action for U.S. Appl. No. 12/036,382, mailed Sep. 1, 2011.

Non-final Office Action for U.S. Appl. No. 12/036,382, mailed Dec. 29, 2010.

Supplementary European Search Report from European Patent Application No. 08730615.5 dated Aug. 13, 2012.

Supplementary European Search Report from European Patent Appln. No. 08730610.6 dated Jul. 31, 2012.

\* cited by examiner

METHOD FOR DISPLAYING A DRAW RESULT ALONG WITH CUSTOMIZED INFORMATION

RELATED APPLICATIONS

This application claims the benefit of U.S. Provisional Application Ser. No. 60/891,591, filed Feb. 26, 2007 and U.S. Provisional Application Ser. No. 60/956,917, filed Aug. 20, 2007. Each of the aforementioned applications is incorporated herein by reference in its entirely.

FIELD OF THE INVENTION

In one embodiment of the present invention a computer-implemented method for displaying a draw result as a race is provided, comprising: generating a draw result, wherein the draw result indicates at least a first place winner; inputting a plurality of animation paths into a computer, wherein each of the plurality of animation paths is associated with a respective one of a plurality of race objects; and rendering an animation with a computer based at least in part upon the input plurality of animation paths and the generated draw result such that the race object to finish first in the animation corresponds to the first place winner of the draw result.

In another embodiment of the present invention a computer-implemented method for displaying a draw result is provided, comprising: generating a draw result, wherein the draw result indicates at least a first place winner; rendering with a computer a first video presentation for display at a first terminal, wherein the first video presentation comprises first content and an indication of the draw result; rendering with a computer a second video presentation for display at a second terminal, wherein the second video presentation comprises second content and an indication of the draw result, and wherein the first content is distinct from the second content; transmitting the first video presentation to the first terminal; and transmitting the second video presentation to the second terminal.

In another embodiment of the present invention a system and method for pseudo-random 3D video game distribution using 2D hardware is provided.

In another embodiment of the present invention a piece-wise temporal algorithm for pseudo-random realistic object motion is provided.

For the purposes of describing and claiming the present invention the term "draw result" is intended to refer to the outcome (e.g., the random outcome) of a selection such as, for example, a lottery drawing. Such a draw result may comprise, for example, a single winning indicium (e.g., a single winning number) or a plurality of winning indicia (e.g., a plurality of winning numbers). When there are a plurality of winning indicia the order of the indicia may be relevant (e.g., 1st, 2nd and 3rd place in a race).

BACKGROUND OF THE INVENTION

Described herein are a set of games called Monitor Games (hereinafter sometimes called simply "games"). In one example, the Monitor Games may be numerical games. The customer places a bet on the outcome (draw result) and watches the resulting virtual event on a local terminal to see if he won. In one example, the games may target a younger audience than traditional players. To keep these younger players interested, complex games with interesting graphics may be required. Of note, the games may need to appear unique each time they are run, even if the draw result is the same.

In one specific example, games must be capable of being run on the current generation systems (e.g., a Coronis system). Such a Coronis system is typically not capable of generating custom 3D content as draw results come in (e.g., such a Coronis system may typically only be capable of displaying pre-rendered video content).

Thus, in one embodiment, the present invention provides a system and method to offer next generation graphics on current generation hardware.

Further, in the field of computer animation there is typically a need to move objects in a scene to generate an animation sequence. A scene is a set of single or multi-dimensional data which specifies, or can be transformed to, 2D coordinates and color intensities for the display device. The display device can either be electronic, such as a computer screen, or physical, such as a photograph. An animation sequence is a set of transformations ("transformations") of the data which when displayed in sequence, produce the appearance of motion on the device.

The transformations must typically be constrained in order to provide a realistic feel to the animation sequence. The uniqueness of an animation sequence is determined by the uniqueness of its transformations. The transformations can be created by hand, or can be generated algorithmically. Thus, if the desire is to generate many unique animation sequences, many constrained transformations must be generated.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment, there may be two types of games displayed: static games and dynamic games (in each type of game, the customers may place bets before the game is run).

Referring first to static games, it is noted that in one example each static game may have a relatively small number of possible outcomes. For each outcome, a constant number of permuted renderings are created off-line and stored at one or more local terminals. For example, if the game is the result of one dice roll, the total number of outcomes is 6. The total permuted outcomes can be arbitrary, but constant. So there might be, for example, 10 pieces of pre-rendered content for each possible dice roll for a total of 60 pre-rendered scenes to choose from.

In one example, the static game can be played as frequently as once a minute, although the time can be longer or shorter. The customers place their bets while introductory content is played (the introductory content may be from a central system and/or a local terminal). Betting closes before the draw result is displayed by each local terminal. During that period, a message warning that betting is closing soon may be provided (the warning may be from a central system and/or a local terminal). Of course, betting may close before the draw result is received by the local terminal or upon issuance of the draw result by the central system. The local terminals receive the draw result and select (e.g., randomly select) content that matches the draw result. The local terminals display the content allowing the customers to visualize the draw result in the context of the game type.

Figure 1:
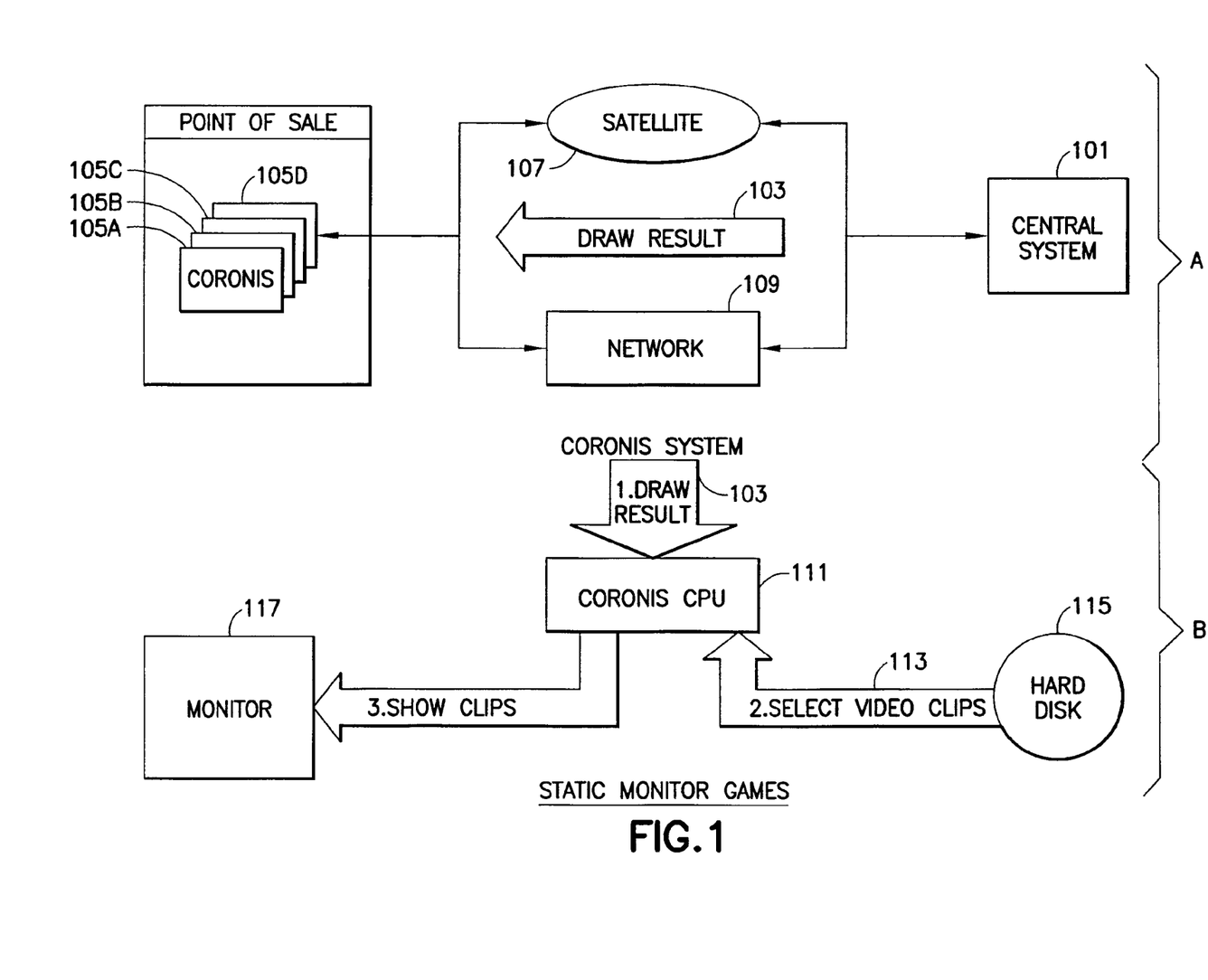
FIG. 1 shows a diagram related to static games according to an embodiment of the present invention.

Reference will now be made to FIG. 1 (related to static games), showing in section "A" delivery of Draw Results from a Central System (e.g., central computer) to each of a plurality of Point of Sale (POS) Coronis systems (that is, local terminals) and in section "B" display of video clips by a given one of the Coronis Systems of section "A".

More particularly, it is seen in this FIG. 1 (in section "A") that Central System 101 may deliver each Draw Result 103 to each of the Point of Sale (POS) Coronis Systems 105A-105D (of course, any desired number of Point of Sale (POS) Coronis Systems may be utilized). The delivery of each Draw Result 103 may be, for example, via Satellite 107 and/or land-based Network 109 (which may be wired and/or wireless).

Further, it is seen in this FIG. 1 (in section "B") that each of Point of Sale (POS) Coronis Systems 105A-105D takes each Draw Result 103 delivered thereto and based upon each Draw Result 103, uses CPU 111 to: (a) select one or more Video Clips 113 (e.g., a set of pre-rendered content which is resident on each local Coronis system) from Hard Drive 115; and (b) show each of Video Clips 113 on Monitor 117. In one example, the CPU 111 takes the draw result and randomly displays a particular set of content which corresponds to the draw result. The content is then rendered to the monitor.

Referring now to dynamic games, such games may again (in one example) have a relatively small number of possible outcomes. Unlike a static game, however, a dynamic game may have objects whose motion is complex. Examples of dynamic games include (but are not limited to) car races or horse races. To achieve a realistic feel, the set of paths the objects take must be sufficiently large. It may be impractical to pre-render sufficient content and thus the content may need to be rendered uniquely for each draw. In this regard, for a dynamic game a central system may produce both a draw result and a unique path for each object in the scene.

In one example, the dynamic game can be played as frequently as once a minute, although the time can be longer or shorter. The customers place their bets while introductory content is played (the introductory content may be from a central system and/or a local terminal). Betting closes before the draw result is displayed by each local terminal. During that period, a message warning that betting is closing soon may be provided (the warning may be from a central system and/or a local terminal). Of course, betting may close before the draw result is received by the local terminal or upon issuance of the draw result by the central system. The draw result is used by the central system to render the art content. In one example, the content is animated in 3D by the central system, which produces the resulting animation sequence as one or more video clips. The video clip(s) are sent to the local terminals for display.

Of course, dynamic games may comprise real-time rendered content as described above as well as pre-rendered content (similar to the static games). In one example, the real-time portion may be delivered (e.g., along with the draw result) by the central system to the local terminals and the pre-rendered content (to the extent it is utilized) may be stored locally at each local terminal.

Figure 2:
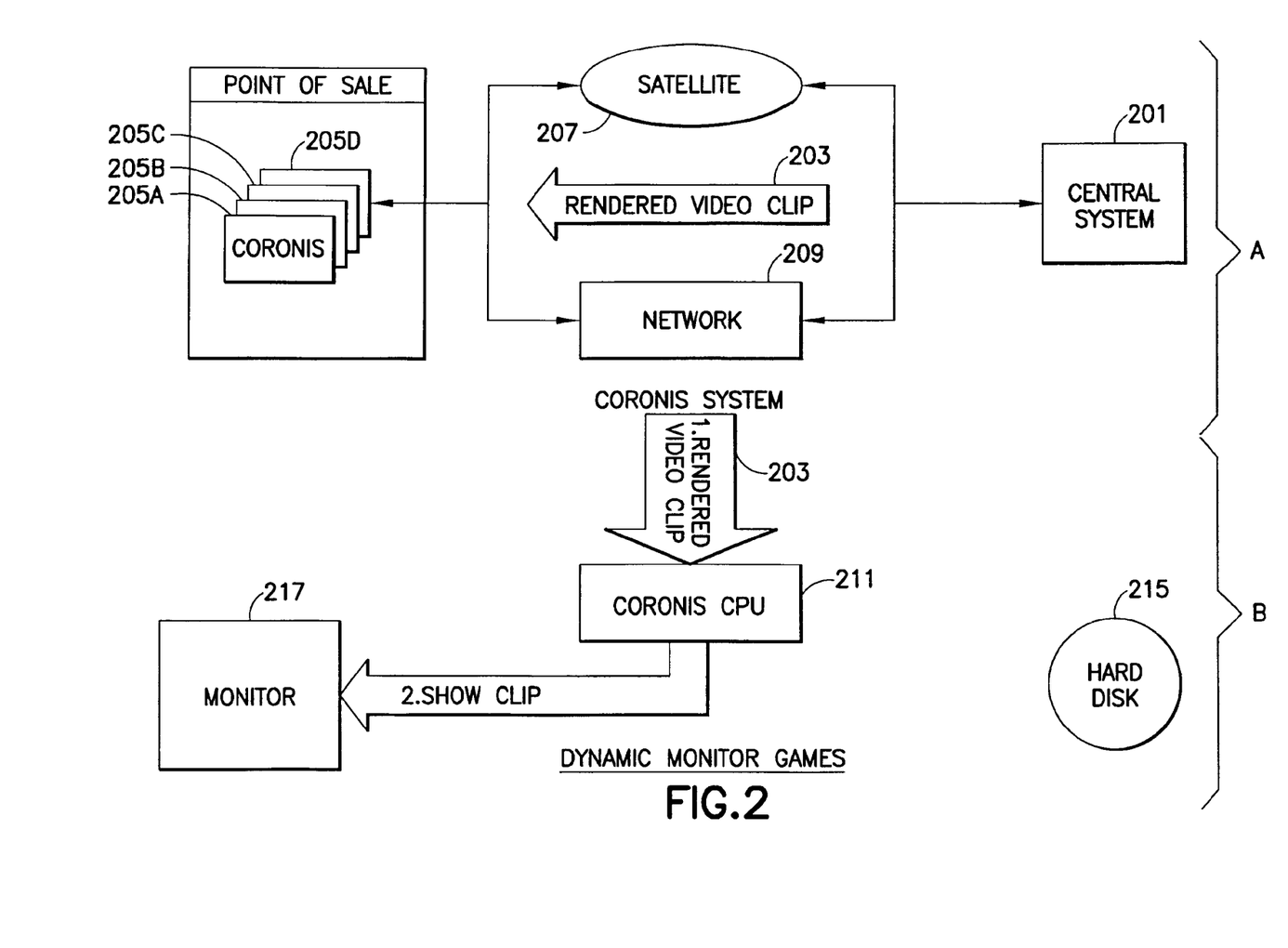
FIG. 2 shows a diagram related to dynamic games according to an embodiment of the present invention.

Reference will now be made to FIG. 2, showing in section "A" delivery of Rendered Video Clips from a Central System (e.g., central computer) of a plurality of Point of Sale (POS) Coronis systems and in section "B" display of the Rendered Video Clips by a given one of the Coronis Systems of section "A".

More particularly, it is seen in this FIG. 2 (in section "A") that Central System 201 may deliver each Rendered Video Clip 203 to each of the Point of Sale (POS) Coronis Systems 205A-205D (of course, any desired number of Point of Sale (POS) Coronis Systems may be utilized). The delivery of each Rendered Video Clip 203 may be, for example, via Satellite 207 and/or land-based Network 209 (which may be wired and/or wireless).

Further, it is seen in this FIG. 2 (in section "B") that each of Point of Sale (POS) Coronis Systems 205A-205D takes each Rendered Video Clip 203 delivered thereto and uses CPU 211 to show each Rendered Video Clip 203 on Monitor 217.

In other embodiments, various systems and methods may be provided via which one or more video presentations may be generated uniquely for each draw. In one example, this allows the system to customize art content to a particular terminal (e.g., a particular Coronis terminal) while allowing the same draw across multiple terminals (e.g., multiple Coronis terminals).

Customization may include, for example, advertising targeted to the current user (e.g., the current Coronis user). In one example, the user may be identified (e.g., at a particular terminal) using a unique identifier such as a RFID or smart card. In another example, the user may be a "statistical" user, whose characteristics are inferred from other data. In another example, the advertising may become part of the 3D artwork for the scene. The system may measure how long the advertising was visible to the user (this data may be used, for example, for billing the advertiser).

Customization may include user specific objects to bet on. For example, if the system is displaying a car race, a unique user may have acquired a car color not generally available (e.g., a custom car color may be acquired either by a separate purchase or the custom car color may be acquired by achieving some gaming related goal, such as a number of plays per hour). Whichever car the user bet on could be of that color. Such customization may work in reverse as well. For example, the user who bet the most money with the system could have his custom car be the car he bets on for the entire system.

In another embodiment of the present invention a computer-implemented method for displaying a draw result is provided, comprising: generating a draw result, wherein the draw result indicates at least a first place winner; rendering with a computer a first video presentation for display at a first terminal, wherein the first video presentation comprises first content and an indication of the draw result; rendering with a computer a second video presentation for display at a second terminal, wherein the second video presentation comprises second content and an indication of the draw result, and wherein the first content is distinct from the second content; transmitting the first video presentation to the first terminal; and transmitting the second video presentation to the second terminal (in some examples, the first and/or second video presentations may rendered by central computer system 101 of FIG. 1 and/or the rendered first and/or second video presentations may be transmitted by central computer system 101 of FIG. 1 to one or more of terminals 105A-105D of FIG. 1 or the first and/or second video presentations may rendered by central computer system 201 of FIG. 2 and/or the rendered first and/or second video presentations may be transmitted by central computer system 201 of FIG. 2 to one or more of terminals 205A-205D of FIG. 2).

In one example, the first content may comprise advertising.

In another example, the first content may comprise advertising and the second content may comprise advertising.

In another example, the first content may comprise advertising customized for a user of the first terminal.

In another example, the second content may comprise advertising customized for a user of the second terminal.

In another example, the user of the first terminal may be identified via a unique identifier.

In another example, the user of the second terminal may be identified via a unique identifier.

In another example, each unique identifier may comprise at least one of a RFID card and a smart card.

In another example, the user of the first terminal may be identified via inference of data subjected to statistical analysis.

In another example, the user of the second terminal may be identified via inference of data subjected to statistical analysis.

In another example, the method may further comprise measuring a length of time that the advertising customized for the first user is displayed at the first terminal (e.g. to the first user).

In another example, the method may further comprise measuring a length of time that the advertising customized for the second user is displayed at the second terminal (e.g., to the second user).

In another example, the method may further comprise billing an advertiser based at least in part upon the measured length of time that the advertising customized for the first user is displayed at the first terminal (e.g., to the first user).

In another example, the method may further comprise billing an advertiser based at least in part upon the measured length of time that the advertising customized for the second user is displayed at the second terminal (e.g., to the second user).

In another example, the first content may comprise an object associated with a bet.

In another example, the second content may comprise an object on which to bet.

In another example, the draw result may be associated with a lottery.

In another example, the draw result may be generated essentially randomly.

In another example, the draw-result may be generated essentially in real-time.

In another example, the draw result may be generated with a computer.

In another example, the draw result may be generated manually (e.g., chosen by hand).

In another example, the computer that renders the first video presentation may be the same computer as the computer that renders the second video presentation.

In another example, the computer that renders the first video presentation may be different from the computer that renders the second video presentation.

In another example, the computer that renders the first video presentation and/or the computer that renders the second video presentation may be the same computer as the computer that generates the draw result.

In another example, the computer that renders the first video presentation and/or the computer that renders the second video presentation may be different from the computer that generates the draw result.

In another example, the first video presentation may be transmitted to the first terminal from the same computer that transmits the second video presentation to the second terminal.

In another example, the first video presentation may be transmitted to the first terminal from a different computer than the computer that transmits the second video presentation to the second terminal.

In another example, the first video presentation may be transmitted to the first terminal via at least one of a satellite connection and a network connection and the second video presentation may be transmitted to the second terminal via at least one of a satellite connection and a network connection In another example, the draw result may comprise a plurality of winning numbers.

In another example, the steps may be carried out in the order recited.

In another embodiment of the present invention a computer-implemented method for displaying a draw result is provided, comprising: generating a draw result, wherein the draw result indicates at least a first place winner, wherein the draw result is generated essentially randomly, wherein the draw result is associated with a lottery, and wherein the draw result is generated with a computer; rendering with a computer a first video presentation for display at a first terminal, wherein the first video presentation comprises first content and an indication of the draw result; rendering with a computer a second video presentation for display at a second terminal, wherein the second video presentation comprises second content and an indication of the draw result, and wherein the first content is distinct from the second content; transmitting the first video presentation to the first terminal; and transmitting the second video presentation to the second terminal; wherein the first content comprises advertising and wherein the second content comprises advertising; wherein the first content comprises advertising customized for a user of the first terminal; and wherein the second content comprises advertising customized for a user of the second terminal (in some examples, the first and/or second video presentations may rendered by central computer system 101 of FIG. 1 and/or the rendered first and/or second video presentations may be transmitted by central computer system 101 of FIG. 1 to one or more of terminals 105A-105D of FIG. 1 or the first and/or second video presentations may rendered by central computer system 201 of FIG. 2 and/or the rendered first and/or second video presentations may be transmitted by central computer system 201 of FIG. 2 to one or more of terminals 205A-205D of FIG. 2).

In one example, the steps may be carried out in the order recited.

Referring now to FIGS. 3A-3D, block diagrams of embodiments of the present invention related to systems for displaying a draw result are shown.

Figure 3A:
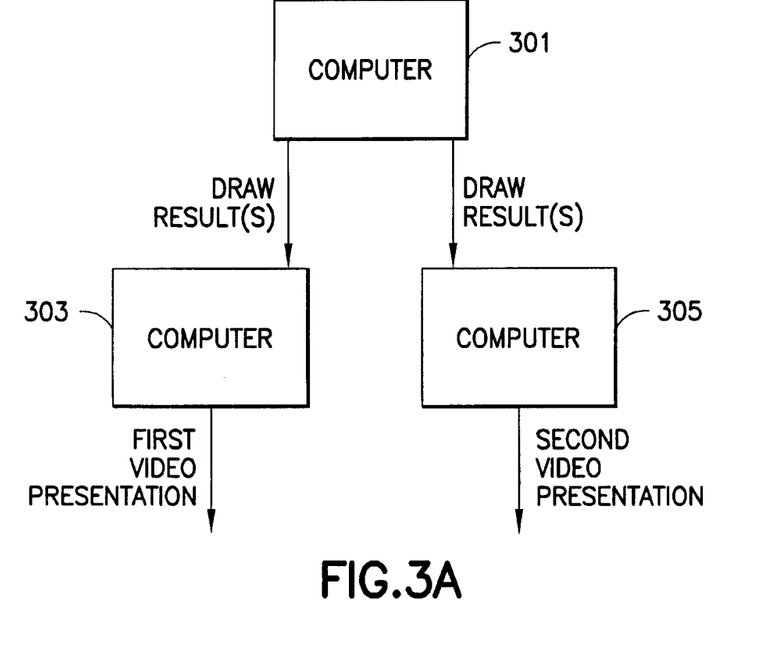
FIGS. 3A-3D show block diagrams of embodiments of the present invention related to systems for displaying a draw result.

Referring first to FIG. 3A, computer 301 may generate draw result(s). The draw result(s) may be input to computer 303. Computer 303 may render a first video presentation for display at a first terminal (in one example, the rendered first video presentation may transmitted by central computer system 101 of FIG. 1 to one or more of terminals 105A-105D of FIG. 1 or the rendered first video presentation may transmitted by central computer system 201 of FIG. 2 to one or more of terminals 205A-205D of FIG. 2). Further, the draw result(s) may be input to computer 305. Computer 305 may render a second video presentation for display at a second terminal (in one example, the rendered second video presentation may transmitted by central computer system 101 of FIG. 1 to one or more of terminals 105A-105D of FIG. 1 or the rendered second video presentation may transmitted by central computer system 201 of FIG. 2 to one or more of terminals 205A-205D of FIG. 2) The rendered first and/or second video presentations may the be used as desired (e.g., to display lottery results at various terminals).

Figure 3B:
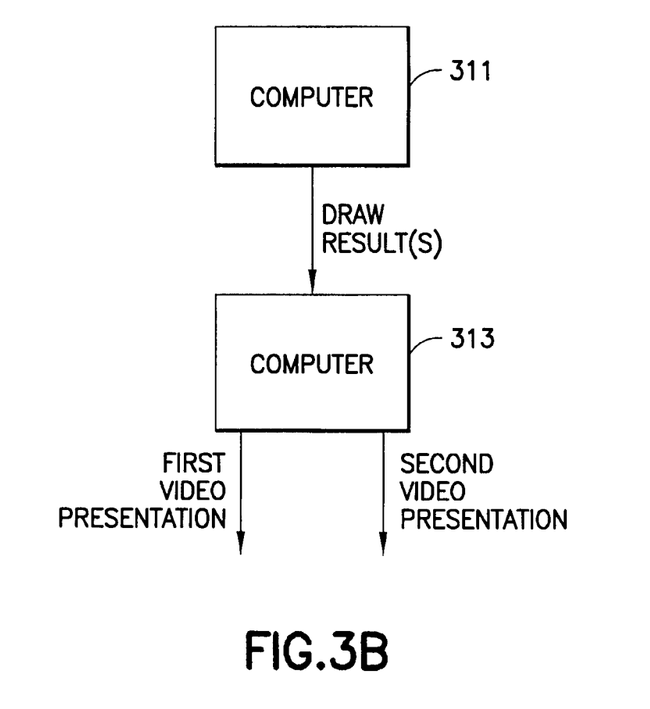

Referring now to FIG. 3B, computer 311 may generate draw result(s). The draw result(s) may be input to computer 313. Computer 313 may render a first video presentation for display at a first terminal (in one example, the rendered first video presentation may transmitted by central computer system 101 of FIG. 1 to one or more of terminals 105A-105D of FIG. 1 or the rendered first video presentation may transmitted by central computer system 201 of FIG. 2 to one or more of terminals 205A-205D of FIG. 2). Computer 313 may also render a second video presentation for display at a second terminal (in one example, the rendered second video presentation may transmitted by central computer system 101 of FIG. 1 to one or more of terminals 105A-105D of FIG. 1 or the rendered second video presentation may transmitted by central computer system 201 of FIG. 2 to one or more of terminals 205A-205D of FIG. 2). The rendered first and/or second video presentations may the be used as desired (e.g., to display lottery results at various terminals).

Figure 3C:
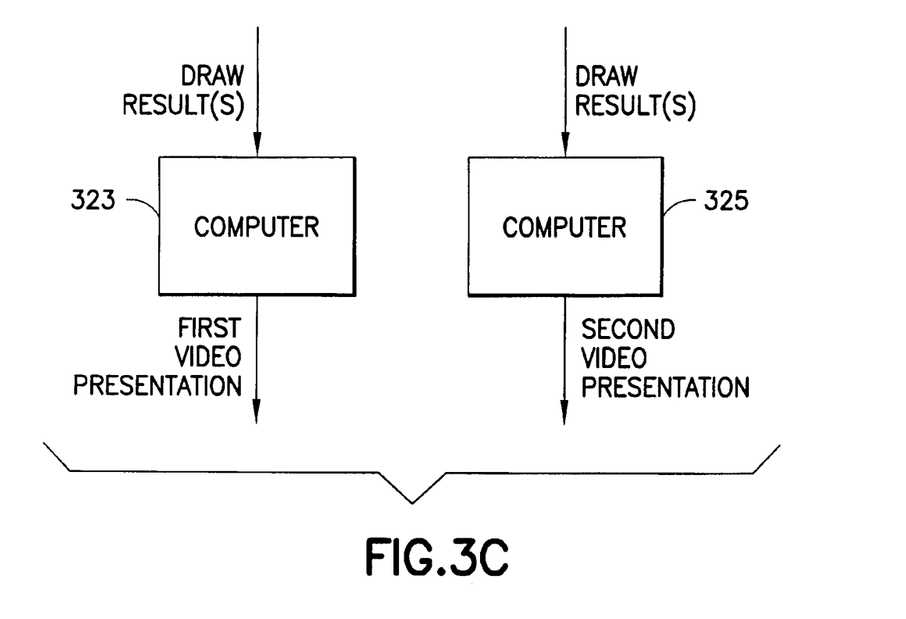

Referring now to FIG. 3C, this is similar to FIG. 3A, but the draw results may be generated manually (e.g., drawn by hand). The draw result(s) may be input to computer 323. Computer 323 may render a first video presentation for display at a first terminal (in one example, the rendered first video presentation may transmitted by central computer system 101 of FIG. 1 to one or more of terminals 105A-105D of FIG. 1 or the rendered first video presentation may transmitted by central computer system 201 of FIG. 2 to one or more of terminals 205A-205D of FIG. 2). Further, the draw result(s) may be input to computer 325. Computer 325 may render a second video presentation for display at a second terminal (in one example, the rendered second video presentation may transmitted by central computer system 101 of FIG. 1 to one or more of terminals 105A-105D of FIG. 1 or the rendered second video presentation may transmitted by central computer system 201 of FIG. 2 to one or more of terminals 205A-205D of FIG. 2) The rendered first and/or second video presentations may the be used as desired (e.g., to display lottery results at various terminals).

Figure 3D:
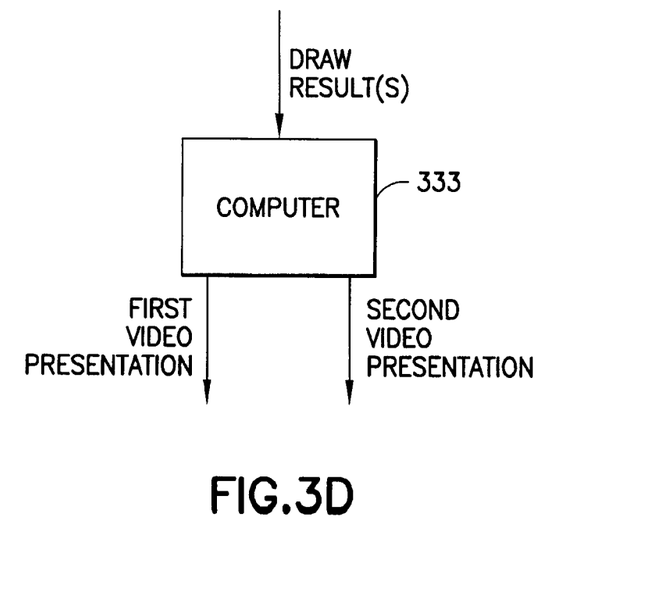

Referring now to FIG. 3D, this is similar to FIG. 3B, but the draw results may be generated manually (e.g., drawn by hand). The draw result(s) may be input to computer 333. Computer 333 may render a first video presentation for display at a first terminal (in one example, the rendered first video presentation may transmitted by central computer system 101 of FIG. 1 to one or more of terminals 105A-105D of FIG. 1 or the rendered first video presentation may transmitted by central computer system 201 of FIG. 2 to one or more of terminals 205A-205D of FIG. 2). Computer 333 may also render a second video presentation for display at a second terminal (in one example, the rendered second video presentation may transmitted by central computer system 101 of FIG. 1 to one or more of terminals 105A-105D of FIG. 1 or the rendered second video presentation may transmitted by central computer system 201 of FIG. 2 to one or more of terminals 205A-205D of FIG. 2) The rendered first and/or second video presentations may the be used as desired (e.g., to display lottery results at various terminals).

Reference will now be made to a piece-wise temporal algorithm ("algorithm") that generates a set of transformations that will animate a set of objects in a scene. The algorithm applies the desired constraints to piecewise description of the transformations needed to animate the objects.

Transformation: The transformation is a set of data which define all the necessary changes for an object, or set of objects, that animate. Each piece of data can be of arbitrary dimension. In one example, three dimensional points are used. Two points define a subset of the animation sequence over which the object starts at the first point and ends at the second point. Two vectors specify an incoming and outgoing direction of the object respectively. The magnitude of each vector is proportional to the velocity with which the object is moving at that particular point. Taken together, this data specifies a Cubic Spline ("spline"). The orientation is inferred from the tangent of the spline. The transformation also contains a set of data which is interpolated from a constraint. The data can be used to control other aspects of the object animation, such as color changes or object data deformation.

Constraints: A constraint is a limitation on the possible value a transformation may take. This constraint may be temporal, spatial or both. The constraint may affect the object in multiple ways. It may constrain its change in position, orientation, velocity, or acceleration. At each point in the algorithm, all constraints must be satisfied in order for a valid transformation to be generated. If there is no valid transform given the constraints, the algorithm describes the minimal constraints which must be relaxed to generate a valid transform.

The Algorithm: The algorithm takes the following constraints as input:

A set of positions that bound a path or track which the objects must move along. The surface of that path are the only valid positions the objects may take.

The number of objects to animate

The starting position of each object

The starting direction of each object

The starting velocity of each object

The ending positions of each object

The extents of each object as a bounding rectangle or sphere

The valid range of directional changes for each object. The dimension of this constraint is the dimension of the position minus one The minimum and maximum acceleration for each object The average and maximum velocity for each object The length of time to animate Step 1: The Algorithm computes the implied average velocity for each object. The Algorithm divides the track into a constant number of pieces. For each piece, the Algorithm perturbs the velocity of each object as it passes over that piece such that over all pieces, the average velocity is maintained and all constraints are satisfied. Orientation is also computed similarly. The starting position is then recomputed for each time step based on the randomly perturbed direction and orientation. This generates a set of positions and orientations over time.

Step 2: Once Step 1 is complete, the Algorithm will fit a set of piecewise curves to the resultant set of position and orientation data. The set of curves are the output of the algorithm. Curves are used to allow for smooth interpolation for the animated objects.

In other embodiments, various systems and methods may be provided in which: (1) a "race" is a set of pre-made artist drawn animation paths (e.g., in 3D) which represent the position and orientation of a set of animated objects (the artist may provide a mapping of the race paths to the finishing order of the objects); and (2) a "camera" is a pre-made artist drawn path (e.g., in 3D) that represents a 3D camera (a 3D camera may have a position and a look-at point, as well as other parameters). Any race set may be combined with any camera.

With this information, the system can take any race and camera set, and render the scene with any draw result (e.g., in real-time). The combinatorial nature of the design means that a large number of final renderings can be achieved by a small set of races and cameras.

In one example, the race path may comprise velocity, acceleration, yaw, and/or orientation for the objects (e.g., for each of the objects). In another example, the race path may comprise (based on object and/or track models) piecewise Bezier splines.

In another embodiment of the present invention a computer-implemented method for displaying a draw result as a race may be provided, comprising: generating a draw result, wherein the draw result indicates at least a first place winner; inputting a plurality of animation paths into a computer, wherein each of the plurality of animation paths is associated with a respective one of a plurality of race objects; and rendering an animation with a computer based at least in part upon the input plurality of animation paths and the generated draw result such that the race object to finish first in the animation corresponds to the first place winner of the draw result (in some examples, the animation may be rendered by central computer system 101 of FIG. 1 and/or the animation may be transmitted by central computer system 101 of FIG. 1 to one or more of terminals 105A-105D of FIG. 1 or the animation may rendered by central computer system 201 of FIG. 2 and/or the animation may be transmitted by central computer system 201 of FIG. 2 to one or more of terminals 205A-205D of FIG. 2).

In one example, the draw result may be generated with a computer.

In another example, the draw result may be generated manually (e.g., chosen by hand).

In another example, the draw result may be associated with a lottery.

In another example, the computer into which the plurality of animation paths are input may be the same computer as the computer which renders the animation.

In another example, the computer into which the plurality of animation paths are input may be a different computer from the computer which renders the animation.

In another example, the computer into which the plurality of animation paths are input and/or the computer which renders the animation may be the same as the computer which generates the draw result.

In another example, the computer into which the plurality of animation paths are input and/or the computer which renders the animation may be different from the computer which generates the draw result.

In another example, the draw result may be input into the computer into which the plurality of animation paths are input.

In another example, the draw result may be input into the computer which renders the animation.

In another example, the method may further comprise: inputting at least one camera path; wherein the rendering the animation may further comprise rendering the animation based at least in part upon the input plurality of animation paths, the input camera path and the generated draw result such that the race object to finish first in the animation corresponds to the first place winner of the draw result.

In another example, the draw result may be generated essentially randomly.

In another example, the draw result may be generated essentially in real-time.

In another example, the rendering may be done essentially in real-time.

In another example, the input plurality of animation paths and the input camera path may be pre-made, prior to the generation of the draw result.

In another example, each of the plurality of race objects may be selected from the group including (but not limited to): (a) a boat; (b) a car; (c) a horse; and (d) a dog.

In another example, each of the plurality of an animation paths may comprise at least one of: velocity; acceleration; and orientation.

In another example, each of the plurality of animation paths may comprise a plurality of piecewise Bezier splines.

In another example, each of the plurality of animation paths may be distinct from one another.

In another example, each camera path may be distinct from one another.

In another example, the steps may be carried out in the order recited.

In another embodiment of the present invention, a computer-implemented method for displaying a draw result as a race is provided, comprising: generating a draw result, wherein the draw result indicates an order of finish of the race, wherein the draw result is generated essentially randomly, wherein the draw result is associated with a lottery, and wherein the draw result is generated with a computer; inputting a plurality of animation paths into a computer, wherein each of the plurality of animation paths is associated with a respective one of a plurality of race objects; and rendering an animation with a computer based at least in part upon the input plurality of animation paths and the generated draw result such that the race objects finish the animation in an order corresponding to the order of finish of the race indicated by the draw result (in some examples, the animation may rendered by central computer system 101 of FIG. 1 and/or the animation may be transmitted by central computer system 101 of FIG. 1 to one or more of terminals 105A-105D of FIG. 1 or the animation may rendered by central computer system 201 of FIG. 2 and/or the animation may be transmitted by central computer system 201 of FIG. 2 to one or more of terminals 205A-205D of FIG. 2).

In another example, the computer into which the plurality of animation paths are input may be the same computer as the computer which renders the animation.

In another example, the computer into which the plurality of animation paths are input may be a different computer from the computer which renders the animation.

In another example, the computer into which the plurality of animation paths are input and/or the computer which renders the animation may be the same as the computer which generates the draw result.

In another example, the computer into which the plurality of animation paths are input and/or the computer which renders the animation may be different from the computer which generates the draw result.

In another example, the draw result may be input into the computer into which the plurality of animation paths are input.

In another example, the draw result may be input into the computer which renders the animation.

In another example, the method may further comprise: inputting at least one camera path; wherein the rendering the animation further comprises rendering the animation based at least in part upon the input plurality of animation paths, the input camera path and the generated draw result such that the race objects finish the animation in an order corresponding to the order of finish of the race indicated by the draw result.

In another example, the steps may be carried out in the order recited.

In another example, there may be 1-5 race objects.

In another example, there may be 1-5 animation paths.

In another example, there may be 1-5 camera paths.

Referring now to FIGS. 4A-4D, block diagrams of embodiments of the present invention related to systems for displaying a draw result as a race are shown.

Figure 4A:
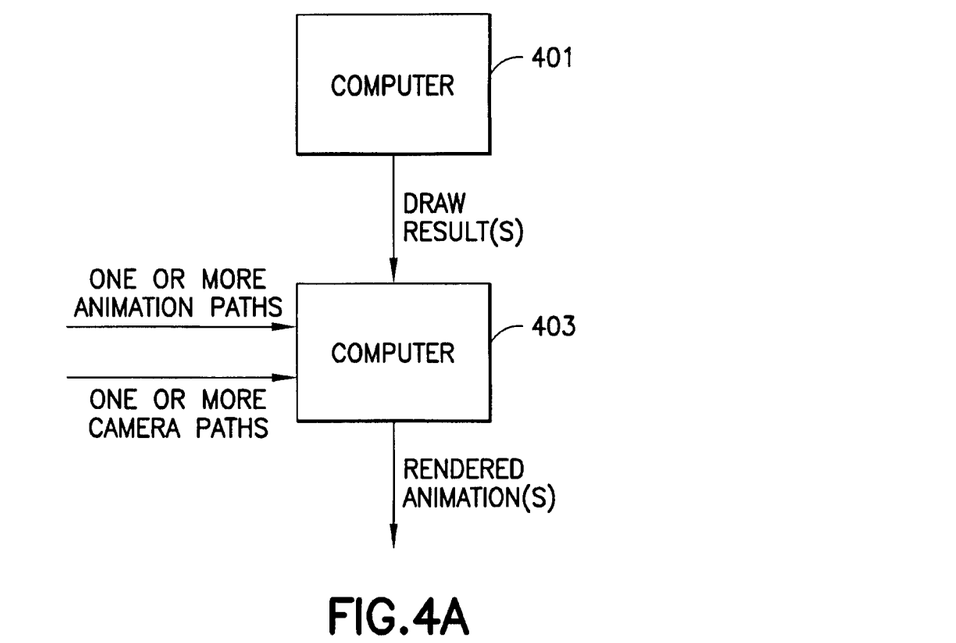
FIGS. 4A-4D show block diagrams of embodiments of the present invention related to systems for displaying a draw result as a race.

Referring first to FIG. 4A, computer 401 may generate draw result(s). The draw result(s) may be input to computer 403, along with data related to one or more animation paths and/or the input data related to one or more camera paths. Computer 403 may render one or more animations based at least in part upon the input draw result(s) and the input data related to one or more animation paths and/or the input data related to one or more camera paths. The rendered animation(s) may then be used as desired (e.g., to display lottery results at various terminals—in one example, the rendered animation(s) may transmitted by central computer system 101 of FIG. 1 to one or more of terminals 105A-105D of FIG. 1 or the rendered animation(s) may transmitted by central computer system 201 of FIG. 2 to one or more of terminals 205A-205D of FIG. 2).

Figure 4B:
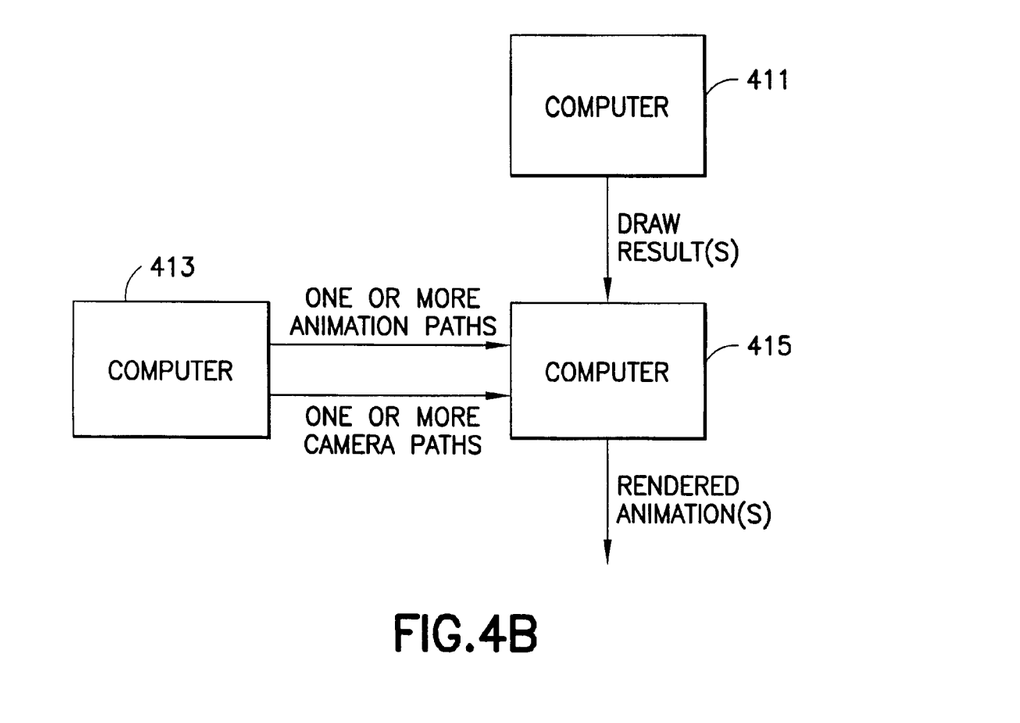

Referring now to FIG. 4B, computer 411 may generate draw result(s). The draw result(s) may be input to computer 415, along with data related to one or more animation paths and/or the data related to one or more camera paths. The data related to one or more animation paths and/or the input data related to one or more camera paths may come from computer 413. Computer 415 may render one or more animations based at least in part upon the input draw result(s) and the input data related to one or more animation paths and/or the input data related to one or more camera paths. The rendered animation(s) may then be used as desired (e.g., to display lottery results at various terminals—in one example, the rendered animation(s) may transmitted by central computer system 101 of FIG. 1 to one or more of terminals 105A-105D of FIG. 1 or the rendered animation(s) may transmitted by central computer system 201 of FIG. 2 to one or more of terminals 205A-205D of FIG. 2).

Figure 4C:
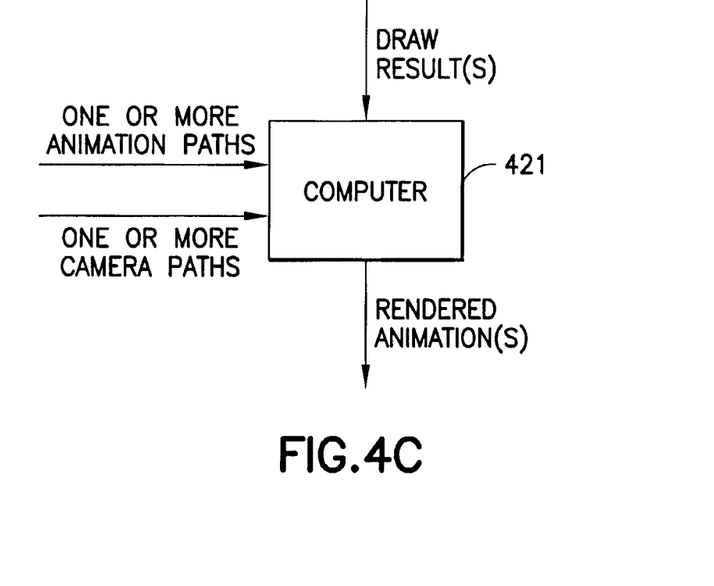

Referring now to FIG. 4C, this is similar to FIG. 4A, but the draw results may be generated manually (e.g., drawn by hand). The draw result(s) may be input to computer 421, along with data related to one or more animation paths and/or data related to one or more camera paths. Computer 421 may render one or more animations based at least in part upon the input draw result(s) and the input data related to one or more animation paths and/or the input data related to one or more camera paths. The rendered animation(s) may then be used as desired (e.g., to display lottery results at various terminals—in one example, the rendered animation(s) may transmitted by central computer system 101 of FIG. 1 to one or more of terminals 105A-105D of FIG. 1 or the rendered animation(s) may transmitted by central computer system 201 of FIG. 2 to one or more of terminals 205A-205D of FIG. 2).

Figure 4D:
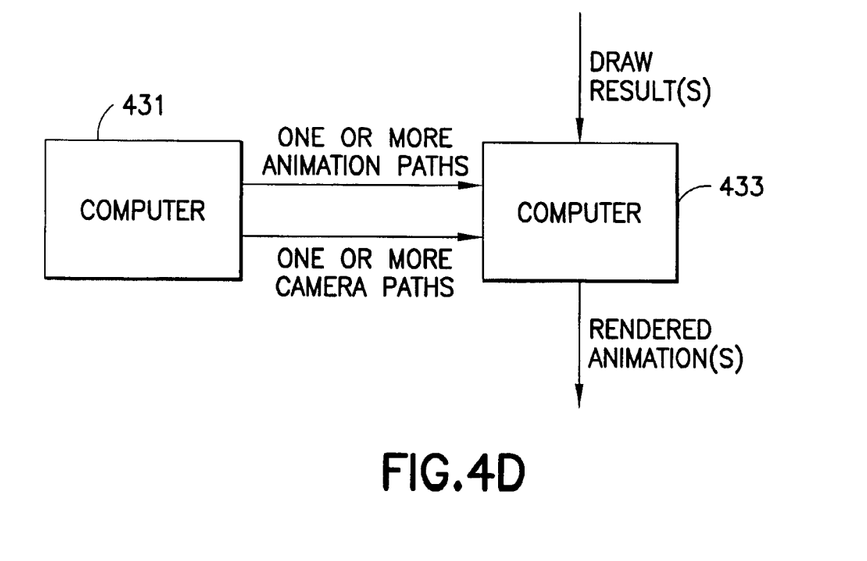

Referring now to FIG. 4D, this is similar to FIG. 4B, but the draw results may be generated manually (e.g., drawn by hand). The draw result(s) may be input to computer 433, along with data related to one or more animation paths and/or the data related to one or more camera paths. The data related to one or more animation paths and/or data related to one or more camera paths may come from computer 431. Computer 433 may render one or more animations based at least in part upon the input draw result(s) and the input data related to one or more animation paths and/or the input data related to one or more camera paths. The rendered animation(s) may then be used as desired (e.g., to display lottery results at various terminals—in one example, the rendered animation(s) may transmitted by central computer system 101 of FIG. 1 to one or more of terminals 105A-105D of FIG. 1 or the rendered animation(s) may transmitted by central computer system 201 of FIG. 2 to one or more of terminals 205A-205D of FIG. 2).

In another example, an artist may draw one or more races (e.g., pre-rendered drawings showing cars on a race track at each position). An artist may take model(s) and track(s) and (e.g., utilizing a computer) generate piecewise Bezier splines for the animation paths (positions, overtaking, etc.). The paths may be selected so that the winning race object(s), for example winning car(s), are mapped to the correct path(s). A real-time animation system may load the paths and add cars to render the animation(s).

In another example, an animation and modeling software package from XSI SOFTIMAGE may be utilized for any required animation and/or modeling tasks (if desired, the XSI text output may be made binary).

As described herein, various embodiments of the present invention may provide a displayed race that may be "interesting", "unique" and/or may "feel realistic".

Of note, the embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, any desired number of draw result(s) may be generated and/or displayed. Further still, any number of computers may be replaced by any other desired number of computers (e.g., one computer may perform the tasks described herein as being done by one or more computers and/or one or more computers may perform the tasks described herein as being done by one computer). Further still, any desired number of users may utilize the present invention. Further still, any desired still image(s) may be used in conjunction with or in place of any desired video. Further still, the various steps may be carried out in any desired order (and any desired steps may be added and/or any desired steps may be eliminated).

What is claimed is:

1. A computer-implemented method comprising:
generating, by a specifically programmed computer system, a first draw result, wherein the first draw result indicates at least one first winner;
displaying, by the specifically programmed computer system, a first animated race video presentation of the first draw result as a first race at a plurality of first terminals, wherein the first animated race video presentation comprises at least one first race animation having a first plurality of animated race objects moving along at least one first animation path in at least one first animated race scene, wherein the at least one first race animation having the first plurality of animated race objects moving along the at least one first animation path in the at least one first animated race scene is generated, in real-time and independently from each player, based on:
i) the first draw result,
ii) a first group comprising:
  1) a first set of pre-made artist drawn race animation paths which represent first positions and first orientations of animated race objects moving along each of the first set of pre-made artist drawn animation paths from a first beginning to a first end of each of the first set of pre-made artist drawn animation paths,
  2) a second set of pre-made artist drawn camera paths which represent three dimensional (3D) camera views, and
  3) a third set of animated race objects moving along each of the first set of pre-made artist drawn animation paths from the first beginning to the first end of each of the first set of pre-made artist drawn animation paths, generated by a piece-wise temporal algorithm; and
iii) a first random selection from the first group to match the first draw result;
generating, by the specifically programmed computer system, a second draw result, wherein the second draw result indicates at least one second winner, wherein the generating of the second draw result is subsequent to the generating of the first draw result; and
displaying, by the specifically programmed computer system, a second animated race video presentation of the second draw result as a second race at the plurality of a terminals, wherein the second animated video presentation comprises at least one second race animation having a second plurality of animated race objects moving along at least one second animation path in at least one second animated race scene, wherein the at least one second race animation having the second plurality of animated race objects moving along the at least one second animation path in the at least one second animated race scene is generated, in real-time and independently from each player, based on:
i) the second draw result,
ii) a second group comprising:
  1) a fourth set of pre-made artist drawn race animation paths which represent second positions and second orientations of the animated race objects moving along each of the fourth set of pre-made artist drawn animation paths from a second beginning to a second end of each of the fourth set of pre-made artist drawn animation paths,
  2) a fifth set of pre-made artist drawn camera paths which represent the three dimensional (3D) camera view, and
  3) a sixth set of animated race objects moving along each of the fourth set of pre-made artist drawn animation paths from the second beginning to the second end of each of the fourth set of pre-made artist drawn animation paths, generated by the piece-wise temporal algorithm; and
iii) a second random selection from the second group to match the second draw result;
wherein the first animated race video presentation of the first draw result of the first race is distinct from the second animated race video presentation of the second draw result of the second race.

2. The method of claim 1, wherein the method further comprises: receiving, by the specifically programmed computer system, from a particular player, at least one customization of at least one characteristic of at least one animated race object, wherein the at least one customization is not generally available to all players and is available to the particular player after the particular player performs at least one of:
i) separately purchasing an option to submit the at least one customization, and
ii) achieving at least one pre-determined gaming related goal.

3. The method of claim 1, wherein the first animated race video presentation further comprises at least one first advertising and wherein the second animated race video presentation further comprises at least one second advertising.

4. The method of claim 3, wherein the at least one first advertising is customized for each player and wherein the at least one second advertising is customized for each player.

5. The method of claim 4, wherein each player is identified via a unique identifier.

6. The method of claim 5, wherein the unique identifier comprises at least one of a RFID card and a smart card.

7. The method of claim 4, wherein each player is identified via inference of data subjected to statistical analysis.

8. The method of claim 4, further comprising;
measuring, by the specifically programmed computer system, a length of time that the at least one first advertising and the at least one second advertising are displayed.

9. The method of claim 8, further comprising;
billing, by the specifically programmed computer system, an advertiser based at least in part upon the measured length of time.

10. The method of claim 1, wherein each of the first and second plurality of animated race objects is associated with a bet.

11. The method of claim 1, wherein the first draw result and the second draw result are associated with a lottery.

12. The method of claim 1, wherein the first draw result and the second draw result are generated randomly.

13. The method of claim 1, wherein the first draw result and the second draw result are generated in real-time.

14. The method of claim 2, wherein the at least one pre-determined gaming related goal is a number of plays per a time period.

15. The method of claim 1, wherein each of the first and second plurality of animated race objects is selected from the group of: (a) a boat; (b) a car; (c) a horse; and (d) a dog.

16. A specifically programmed computer system, comprising:
a) a non-transient memory having at least one region for storing computer executable program code; and b) at least one processor for executing the program code stored in the non-transient memory, wherein the program code comprising:

code to generate a first draw result, wherein the first draw result indicates at least one first winner;

code to display a first animated race video presentation of the first draw result as a first race at a plurality of terminals, wherein the first animated race video presentation comprises at least one first race animation having a first plurality of animated race objects moving along at least one first animation path in at least one first animated race scene, wherein the at least one first race animation having the first plurality of animated race objects moving along the at least one first animation path in the at least one first animated race scene is generated, in real-time and independently from each player, based on:

i) the first draw result, ii) a first group comprising:
  1) a first set of pre-made artist drawn race animation paths which represent first positions and first orientations of animated race objects moving along each of the first set of pre-made artist drawn animation paths from a first beginning to a first end of each of the first set of pre-made artist drawn animation paths,
  2) a second set of pre-made artist drawn camera paths which represent three dimensional (3D) camera views, and
  3) a third set of animated race objects moving along each of the first set of pre-made artist drawn animation paths from the first beginning to the first end of each of the first set of pre-made artist drawn animation paths, generated by a piece-wise temporal algorithm; and iii) a first random selection from the first group to match the first draw result;

code to generate a second draw result, wherein the second draw result indicates at least one second winner, wherein the generating of the second draw result is subsequent to the generating of the first draw result; and code to display a second animated race video presentation of the second draw result as a second race at the plurality of terminals, wherein the second animated video presentation comprises at least one second race animation having a second plurality of animated race objects moving along at least one second animation path in at least one second animated race scene, wherein the at least one second race animation having the second plurality of animated race objects moving along the at least one second animation path in the at least one second animated race scene is generated, in real-time and independently from each player, based on:

i) the second draw result, ii) a second group comprising:
  1) a fourth set of pre-made artist drawn race animation paths which represent second positions and second orientations of the animated race objects moving along each of the fourth set of pre-made artist drawn animation paths from a second beginning to a second end of each of the fourth set of pre-made artist drawn animation paths,
  2) a fifth set of pre-made artist drawn camera paths which represent the three dimensional (3D) camera views, and
  3) a sixth set of animated race objects moving along each of the fourth set of pre-made artist drawn animation paths from the second beginning to the second end of each of the fourth set of pre-made artist drawn animation paths, generated by the piece-wise temporal algorithm; and iii) a second random selection from the second group to match the second draw result;

wherein the first animated race video presentation of the first draw result of the first race is distinct from the second animated race video presentation of the second draw result of the second race.

17. The system of claim 16, wherein the program code further comprises: code to receive, from a particular player, at least one customization of at least one characteristic of at least one animated race object, wherein the at least one customization is not generally available to all players and is available to the particular player after the particular player performs at least one of:

i) separately purchasing an option to submit the at least one customization, and ii) achieving at least one pre-determined gaming related goal.

18. The system of claim 16, wherein the first animated race video presentation further comprises at least one first advertising and wherein the second animated race video presentation further comprises at least one second advertising.

19. The system of claim 18, wherein the at least one first advertising is customized for each player and wherein the at least one second advertising is customized for each player.

20. The system of claim 19, wherein each player is identified via a unique identifier.

21. The system of claim 20, wherein the unique identifier comprises at least one of a RFID card and a smart card.

22. The system of claim 19, wherein each player is identified via inference of data subjected to statistical analysis.

23. The system of claim 19, wherein the program code further comprises:

code to measure a length of time that the at least one first advertising and the at least one second advertising are displayed.

24. The system of claim 23, the program code further comprises:

code to bill an advertiser based at least in part upon the measured length of time.

25. The system of claim 16, wherein each of the first and second plurality of animated race objects is associated with a bet.

26. The system of claim 16, wherein the first draw result and the second draw result are associated with a lottery.

27. The system of claim 16, wherein the first draw result and the second draw result are generated randomly.

28. The system of claim 16, wherein the first draw result and the second draw result are generated in real-time.

29. The system of claim 17, wherein the at least one pre-determined gaming related goal is a number of plays per a time period.

30. The system of claim 16, wherein each of the first and second plurality of animated race objects is selected from the group of: (a) a boat; (b) a car; (c) a horse; and (d) a dog.

* * * * *